(12) United States Patent
Uskolovsky et al.

(10) Patent No.: US 6,738,088 B1
(45) Date of Patent: *May 18, 2004

(54) METHOD AND DEVICE FOR SIMULTANEOUS ENHANCING SAFETY OF DRIVING AND SECURITY OF DRIVERS

(76) Inventors: Alexander Uskolovsky, 1348 N. Sierra Bonita Ave., #204, Los Angeles, CA (US) 90046; Alexander Rozenbaum, 25 Cedar Lake, Irvine, CA (US) 92614

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 795 days.

(21) Appl. No.: 09/095,462

(22) Filed: Jun. 10, 1998

Related U.S. Application Data

(60) Provisional application No. 60/049,323, filed on Jun. 11, 1997.

(51) Int. Cl.[7] .................................................. H04N 7/18
(52) U.S. Cl. ........................ 348/148; 348/149; 348/151; 359/896; 382/104; 382/106; 386/68; 386/117; 396/427; 396/428; 396/429; 396/502
(58) Field of Search ................................. 348/148, 164, 348/118, 149, 151; 358/335, 108, 103; 359/896; 386/68, 117; 382/104, 106; 396/427, 428, 429, 502

(56) References Cited

U.S. PATENT DOCUMENTS

| | | | | |
|---|---|---|---|---|
| 4,843,463 A | * | 6/1989 | Michetti ..................... | 358/108 |
| 5,027,200 A | * | 6/1991 | Petrossian et al. ........... | 358/103 |
| 5,140,436 A | * | 8/1992 | Blessinger .................. | 358/335 |
| 5,289,321 A | * | 2/1994 | Secor .......................... | 359/896 |
| 5,570,127 A | * | 10/1996 | Schmidt ...................... | 348/148 |
| 5,596,382 A | * | 1/1997 | Bamford ...................... | 396/429 |
| 5,670,935 A | * | 9/1997 | Schofield et al. ........... | 340/461 |
| 5,701,015 A | * | 12/1997 | Lungershausen et al. ... | 396/109 |
| 5,708,410 A | * | 1/1998 | Blank et al. ................. | 340/438 |
| 5,764,785 A | * | 6/1998 | Jones et al. .................. | 382/106 |
| 5,798,458 A | * | 8/1998 | Monroe .......................... | 360/5 |

* cited by examiner

*Primary Examiner*—Shawn S. An

(57) ABSTRACT

The method and device help avoid traffic accidents and violations through significant enhancing safety and convenience of driving by providing a far better rear and side observation including in darkness, and reliably prevent, if an accident/violation occurs, from misjudging, owing to an unbeatable legal evidence through recording the objective pattern of the accident/violation . It is accomplished by positioning into a vehicle an onboard digital camera having at least one lens with a photo-receiver, shooting permanently the surroundings at an predetermined frequency, showing images captured on at least one onboard screen, and making the running sequence of images through digital memory so that a latest image captured is recorded and stored in digital memory expelling an oldest one and the overall amount of the images and, hence, duration of time recorded does not change. When responding to an accident/violation, at the instant of occurrence plus a predetermined delay, shooting stops (either automatically by an impact of a collision, or manually), and digital memory retains the congealed sequence of images just before, during, and shortly after the event.

12 Claims, 1 Drawing Sheet

METHOD AND DEVICE FOR SIMULTANEOUS ENHANCING SAFETY OF DRIVING AND SECURITY OF DRIVERS

CROSS-REFERENCES TO RELATED APPLICATIONS

This invention uses the transmission of our Provisional Patent Application under the name "Capturing Objective Pattern of Traffic Auto Accident", Serial No. 60/049,323, filing date Jun. 11, 1997.

BACKGROUND

1. Field of Invention

This invention relates generally to vision systems for vehicles and, more particularly, to vision systems utilizing image capture devices.

2. Discussion of Prior Art

Traffic accident or violation takes mere seconds to happen, but weeks, or even months and years, to be,—if it can be at all,—resolved, often unjustly, let alone fatalities, injuries, material and emotional losses, and stresses. So, there is an urgent need not only to avoid an autoaccident or violation as much as possible, but also to prevent misjudging if the accident or violation occurs. To satisfy this need, it is necessary not only real enhancing safety and convenience of driving as first of all, but also reliable and qualitative getting an objective pattern of a traffic accident or violation if it happened.

As a rule, such occurrences dash all of a sudden for a split second, though without witnesses and any records of even a single glimpse of the episode. Such vague situation creates great opportunities for setups, frauds, and injustice. According to the California Department of Insurance, at least 3% of all accidents'claims result from stage-managed collisions (setups). Considering a total tab (repairs, medical bills) of about $200 billion, the setups account for $6.0 billion per year in idemnifications, let alone moral damages, legal and investigation costs, and wasting of valuable materials and labor. Usually, owners of new expensive models become victims, and also the rest of the insured law-abiding motorists because of overall premium increase. National Insurance Crime Bureau (NICB), supported by more than 1,000 insurers, states that you might be paying about $200 annually in higher premiums for phony claims. The NICB's tip: carry a disposable camera in your car, and take pictures of the scene after an accident, if you are able. It is clear, to prevent from phony claims and misjudging after an alleged traffic accident/violation, that would be best taking pictures automatically before and during it, but, till lately, there have been no befitting means motorists could use.

U.S. Pat. No. 4,843,363 to Michetti (1989), shows the audio-visual videotape recording system mounted in or on a land vehicle to record trip events and driver's activities forward and rearward simultaneously and show in a television screen during a replay of the video tape. While this system did not suggest at all any application for enhancing the safety of vehicle operation, its inherent drawbacks of low reliability, and very limited durability, and high-cost maintenance, due to the sensitive precise tape recording mechanism with a lot of quickly moving parts, prevent even to the intended use to record the situation around the vehicle for each trip requiring continuous recording for unlimited time of whole life of the vehicle. Since at that time there were no reliable durable means for continuous recording, this problem was not solved before, and the situation in current highways, becoming increasingly crowded with traffic causing more and more accidents/violations, urges the solution to come desperately.

Video cameras in squad cars, sometimes used by the police, cannot make wide use because of the cameras'low reliability, high cost of maintenance, and very limited durability due to their sensitive precise mechanism with fast moving parts. So, they are not good at long permanent use, especially for regular consumers who do not want additional hassles while benefits are not quick and apparent.

Also, to meet the goal of real enhancing traffic safety and convenience of driving, it is essential to eliminate menace and inconvenience of shifting one's glance from a rear- to a side-view mirror and back, and "blind spots" and limited observation through the side- and rear-view mirrors, especially for trucks, buses, sports utility vehicles, sports cars, and vans. There is an apparent reason the problem of a better rear and side observation has not been solved yet: while permanent increasing the amount, mileage (mobility), and sizes of motor vehicles, especially trucks, vans, and sports utility vehicles, makes traffic more and more heavy, till recently there have been no proper means regular mass consumers could use.

Inferior remedies like conventional convex mirrors can hardly help to enhancing safety, because they dramatically distort a real picture and actual distances thus causing a motorist into dangerous situations.

At night, in darkness, regular mirrors can provide only dazzling reflection of headlights from behind, without the view of details of the picture itself.

Accordingly, several main objects and advantages of our invention are:

avoidance of traffic accidents and violations through significant enhancing safety and convenience of driving by providing a far better rear and side observation including in darkness;

reliable prevention, if an accident/violation occurs, from misjudging, owing to an unbeatable legal evidence through recording the objective pattern of the accident/violation.

Other objects and advantages of our invention are:

ease and convenience to use, learn to use, and to meet service requirements, simplicity, compactness, soundness, low cost and ease of maintenance, reliability and durability of the equipment because of absence of any moving parts;

operability and compatibility with existing motor vehicles'systems;

reliable, novel, and higher quality results compared to alternative ways of enhancing traffic safety;

profitability, unlimited market size without any legal, climatic, and economic restrictions, and a year-round demand with increasing trend due to the expansion of the field of use for many years to come;

consumer excitement for the high-tech gadget, and a possible high markup;

related product addability because of ushering in a new product line;

market independence because it is useful in its own rights.

Further objects and advantages of this invention will become apparent from a consideration of the ensuing description.

SUMMARY

The method and device for enhancing traffic safety and convenience of driving through providing a far better rear and side observation including in darkness, and reliable prevention, if an accident/violation occurs, from misjudging owing to an unbeatable legal evidence through recording the objective pattern of the accident/violation, thus providing to drivers the safety from being victimized and security from doing an injustice.

DESCRIPTION OF INVENTION

Figure 1:
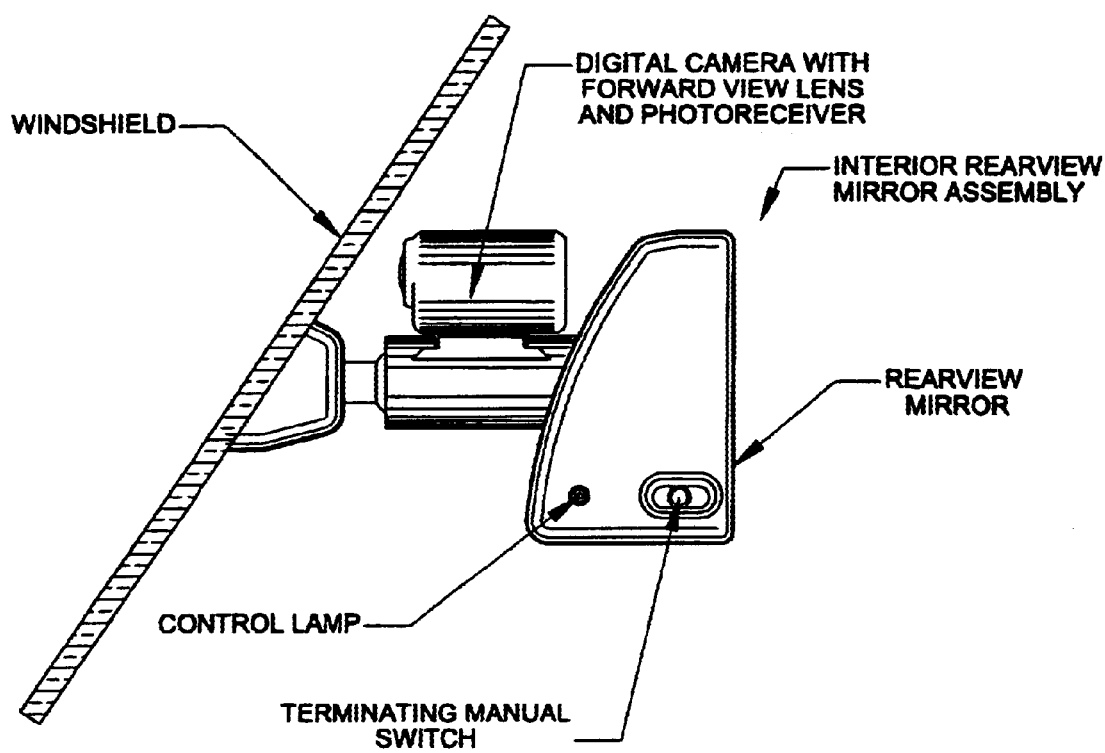
FIG. 1 shows an embodiment of the invention.

Thus there is a problem when getting an objective pattern of a traffic accident/violation because, as a rule, it is lasting, all of a sudden, for a very short time (split second or, at the most, few seconds), often without any witnesses or with bogus ones, and each party is inclined to see its own biased picture which is usually favorable for this party. Hence, the judgment about who is principally at fault is forced to be based on subjective testimonies from the parties involved, witnesses (if any), and indirect physical evidences and assumptions (the nature of the damage, paint transfers, skid marks, and so on) which are necessary to seek for emerging the objective fuller picture of the accident/violation, with fail often.

Our method and device provide the getting an objective full pattern of an auto accident/violation without fail by positioning into a vehicle an onboard digital camera which permanently continuosly, unless turned off manually, shoots the surroundings while in traffic until an accident/violation occurs, plus a short while after. Because of insignificantly small energy consumable in the mode of shooting and the absence of any moving mechanical parts, the camera can shoot and record images of surroundings for virtually unlimited time, even when parking (powered by a car's battery), to fix the scene if the vehicle hit by another passing by one.

Images captured are stored in digital solid state memory (say, the flash card) so that the latest image expels the oldest one.

Such capturing, besides providing an objective full pattern just before, during, and immediately after an accident/violation, enables to figure out appropriate crucial data: speeds of vehicles involved, the duration of yellow traffic light or stopping at a stop sign, and so on, by means of a built-in timer; and license plate numbers, the make, model, and color of passerby vehicles to track down those motorists for tale statements from them, by means of zooming images. Owing to keeping leads to possible fraud, capturing prevents from stage-managing (set-up) accidents/violations and further misjudging.

The camera can have some lenses with photo-receivers to be disposed, for example, on a central interior rear-view mirror to observe the situation in front of a vehicle, on a rear windshield or the back part of a vehicle to observe the situation behind the vehicle, and so on. Additional lenses with receivers, say, on a side-view mirrors can eliminate their inherent "blind spots" and provide a full side picture without distortions peculiar to convex mirrors. These right and left pictures can be shown on, say, onboard LCD-screens attached to the left and the right of interior rear-view mirror (or rear-view LCD screen) so that a driver can see a full real rear and side picture at a glance. Images from different lenses are captured and stored concurrently.

Aboard a vehicle, machinery involved in this process comprises the digital camera having at least one photo-receiver with the lens, a data processor, switches, and digital solid state memory providing the storage for a predetermined amount of images to cover a substantially long interval of time, therewith the latest image expels the oldest one, after the memory is full. A rear-view mirror on a windshield can incorporate the camera into their common housing with the possibility of attaching and detaching the camera.

At night, in darkness, when regular mirrors can provide only dazzling reflection of headlights from behind, appropriate filtering out by the camera only the dazzling visible part of light, but, for example, infrared rays, can give clear vision of surroundings like in night vision devices. Installation of the camera can be performed, like for car stereo, whatever way: by vehicle makers, dealers, selected body shops, or directly customers as "do-it-yourself".

OPERATION OF INVENTION

The manner of operation of the camera is as follows:

the camera permanently continuosly shoots, unless turned off manually, at an equal frequency the surroundings throughout at(leas one lens with the photo-receiver;

the camera's data processor makes the running sequence of images through digital solid state memory so that a latest image captured is recorded and stored in the digital memory, expelling an oldest one, and the overall amount of the images and, hence, duration of time recorded does not change;

when responding to an accident/violation, at the instant of occurrence plus a predetermined delay, shooting stops (either automatically by the impactresponsive switch as the result of collision, or the manual switch), and memory retains the congealed sequence of images just before, during, and shortly after the event;

persons interested reviews the sequence of images from memory to get the objective pattern of an accident/violation.

For example, at any given moment the camera with memory of 300 images and frequency of 30 shots per second can hold permanently the sequence of images with duration of 10 seconds, say, 8 seconds before and during, and 2 seconds after an accident/violation.

CONCLUSION, RAMIFICATIONS, AND SCOPE OF INVENTION

Thus, this method and device provide significant enhancing traffic safety and convenience of driving owing to a far better rear and side observation including in darkness, and reliable prevention, after an accident/violation, from misjudging through keeping the objective picture of the accident/violation.

Owing to absence of any moving parts, the digital camera is very reliable, durable, and easy and low cost to maintain. It has really simple, compact, and sturdy structure, which stands up for vibration, dust, and other environmental influences very well. The camera do not request any training or preparing to use and learn to use, and actually it works virtually itself, like rear- and side-view mirrors, without any participation of a driver. It well fit in with existing equipment of motor vehicles and is operable under heaviest conditions of driving. While this above description contains many specifities, these should not be construed as limiting the scope of the invention, but rather as providing illustrations of some of the presently preferred embodiments thereof Many other variations are possible. For example, the camera can be used as conventional digital camera for regular entertainment (family events), business (field records, conferencing), and educational and scientific (gathering research data) applications; it can be connected to a laptop or an onboard computer to exchange digital image data, etc.

Thus the scope of the invention should be determined by the appended claims and their legal equivalents, rather than by the examples given.

We claim:

1. A method of avoidance of traffic accidents and violations through significant enhancing safety and convenience of driving by providing a better observation including under limited visibility conditions comprising:

a) positioning aboard a vehicle at least one digital camera with facile attaching and detaching, said digital camera having at least one photoreceiver, one lens for forward view, and one lens for rear view, whereby an user can employ the camera separately from said vehicle for regular manually operated applications;

b) continuously shooting at a predetermined frequency by the camera, unless turned off manually, surroundings of said vehicle;

c) filtering out by said camera under limited visibility conditions the visible part of received light flow including dazzling headlights to give significantly distinct vision of said surroundings to a driver under low light or fog, rain, snowfall or smoky conditions;

d) showing images captured in front and on the sides of, and behind said vehicle by said digital camera on at least one onboard screen so that said driver can see forward, left and right, and rear views of a full real-time picture of said surroundings at a glance, including under low light or fog, rain, snowfall or smoky conditions.

2. The method of claim 1, wherein said camera having said lens with photoreceiver for forward view is fixedly disposed on the interior rearview mirror assembly to observe the situation in front of said vehicle and at least one lens with photoreceiver for rear view is fixedly disposed mesially on said vehicle to observe the situation behind and on the sides of said vehicle.

3. The method of claim 1, wherein the lenses with photoreceivers are fixedly disposed on right and left outside rearview mirrors of said vehicle to eliminate "blind" spots and provide a fill picture for observing the situation on the sides of and behind said vehicle, and the lens with photoreceiver for forward view is fixedly disposed on the interior rearview mirror assembly to observe the situation in front of said vehicle.

4. A method of reliable prevention, if an accident/violation occurs, from misjudging, owing to an unbeatable legal evidence through recording the fill objective pattern of the accident/violation comprising:

a) positioning aboard a vehicle at least one digital camera with facile attaching and detaching, said digital camera having at least one photoreceiver, one lens for forward view, one lens for rear view, means for selectively reading out said photoreceiver to get image signals, solid state digital memory to store said image signals, a data processor, a terminating manually operated switch, and a terminating automatic impactresponsive circuit;

b) continuously shooting at a predetermined frequency and recording by the camera, unless turned off manually, surroundings of said vehicle, therewith filtering out under limited visibility conditions the visible part of received light flow including dazzling headlights in front of and from behind said vehicle to give significantly distinct pictures of said surroundings just before, during, and shortly after the accident/violation;

c) making a running sequence of images captured through the digital memory by said data processor so that a latest image captured is recorded and stored in said memory therewith expelling an oldest image after said memory is full, whereby the overall amount of images in said memory and thus duration of time recorded does not change;

d) responding to an accident/violation, at the instant of occurrence plus a predetermined delay, the shooting is stopped by at least one of terminating the impactresponsive automatic circuit and the manually operated switch, whichever is earlier, and said memory retains the congealed sequence of images just before, during, and shortly after the occurrence;

e) reviewing by persons interested from said memory the sequence of images captured in front and on the sides of and behind said vehicle by said digital camera to get the full objective pattern of an accident/violation.

5. The method of claim 4, wherein said camera with facile attaching and detaching to use for regular manually operated applications is incorporated fixedly into an interior rearview mirror assembly.

6. The method of claim 4, wherein at least one lens with photoreceiver for rear view is fixedly disposed mesially on said vehicle to record the situation behind and on the sides of said vehicle, and one lens with photoreceiver for forward view is disposed fixedly on the interior rearview mirror assembly to record the situation in front of said vehicle.

7. The method of claim 4, wherein the lenses with photoreceivers are fixedly disposed on outside rearview mirrors of said vehicle to eliminate "blind spots" and provide a full side picture for recording the situation on the sides of and behind said vehicle.

8. A vehicle vision system for avoidance of traffic accidentt/violations through significant enhancing safety and convenience of driving by providing a better observation including under limited visibility conditions and reliable prevention, if an accident/violation occurs, from misjudging, owing to an unbeatable legal evidence through recording the objective pattern of the accident/violation comprising:

a) aboard a vehicle, at least one readily attaching and detaching digital camera for shooting continuously at a predetermined frequency surroundings by the camera, unless turned off manually, having:

at least one lens with a photoreceiver;

means for selectively reading out said photoreceiver to get image signals;

solid state digital memory to store said image signals;

a data processor making a running sequence of images captured through the memory so that a latest image captured is recorded and stored in said memory, therewith expelling an oldest image after said memory is full, and the overall amount of the images in said memory and thus duration of time recorded does not change;

a terminating automatic impactresponsive circuit and a terminating manually operated switch to stop said shooting responding to an accident/violation at the instant of occurrence plus a predetermined delay, and to provide that said memory retains the congealed sequence of images just before, during, and shortly after the occurrence;

means for selectively filtering out under limited visibility conditions the visible part of received light flow including dazzling headlights in front of and from behind said vehicle to give significantly distinct pictures of said surroundings under low light or fog, rain, snowfall, or smoky conditions;

b) at least one onboard screen for showing images captured by said camera so that a driver of said vehicle can see forward left and right, and rear views of a full real-time picture of said surroundings at a glance.

9. The system of claim 8, wherein said camera with facile attaching and detaching to use for regular manually operated applications is fixedly incorporated into an interior rearview mirror assembly.

10. The system of claim 8, wherein said lens with photoreceiver for forward view is fixedly disposed on the interior rearview mirror assembly to observe and record the situation in front of said vehicle and at least one lens with photoreceiver for rear view is fixedly disposed mesially on said vehicle to observe and record the situation behind and on the sides of said vehicle.

11. The system of claim 8, wherein said lenses with photoreceivers are disposed on right and left outside rearview mirrors of said vehicle, to eliminate "blind spots" and provide a full picture for observing and recording the situation on the sides of and behind said vehicle.

12. The system of claim 8, wherein images captured in front and on the sides of and behind said vehicle by said lenses with photoreceivers are reproduced on at least one onboard screen to show correspondingly the forward, left and right, and rear views so that said driver can see a full real-time picture of said surroundings at a glance, including under low light or fog, rain, snowfall, or smoky conditions.

* * * * *